United States Patent [19]

Robertson et al.

[11] 4,269,274

[45] May 26, 1981

[54] STREAMLINED WEAR-RESISTANT DEEP TILLAGE TOOL

[75] Inventors: Forrest E. Robertson; Donald E. Williams, both of Garden City, Kans.

[73] Assignee: Acra Plant, Inc., Garden City, Kans.

[21] Appl. No.: 47,202

[22] Filed: Jun. 11, 1979

[51] Int. Cl.³ .............................................. A01B 13/08
[52] U.S. Cl. .................... 172/699; 172/713; 172/749; 37/142 R
[58] Field of Search ............... 172/719, 699, 749, 753, 172/762, 770, 713; 37/141 T, 142 R

[56] References Cited

U.S. PATENT DOCUMENTS

| | | | |
|---|---|---|---|
| 2,222,071 | 11/1940 | Gustafson | 172/762 |
| 2,619,054 | 11/1952 | Bell | 172/699 |
| 2,904,119 | 9/1959 | Hunter | 172/762 |
| 3,002,574 | 10/1961 | Padrick | 172/770 X |
| 3,341,253 | 9/1967 | Hostetter | 37/142 R |
| 3,357,117 | 12/1967 | Petersen | 172/762 |
| 3,517,752 | 6/1970 | Glee | 172/721 |
| 3,919,951 | 11/1975 | Williams | 111/7 |
| 4,033,271 | 7/1977 | Williams | 172/699 |

FOREIGN PATENT DOCUMENTS

| | | | |
|---|---|---|---|
| 496012 | 9/1953 | Canada . | |
| 428327 | 5/1935 | United Kingdom | 37/142 R |
| 1022844 | 3/1966 | United Kingdom . | |
| 1200791 | 8/1970 | United Kingdom . | |

Primary Examiner—Richard J. Johnson

[57] ABSTRACT

A detachable, self-sharpening digging shoe for deep tillage shanks is shaped, sized and disposed in a manner to provide the proper angle of attack and to minimize resistance to its movement through the soil such that the movement is not only smooth but incapable of creating that kind of soil turbulence which normally results in substantial wear on critical areas of the shoe and the shank.

1 Claim, 6 Drawing Figures

U.S. Patent  May 26, 1981  4,269,274
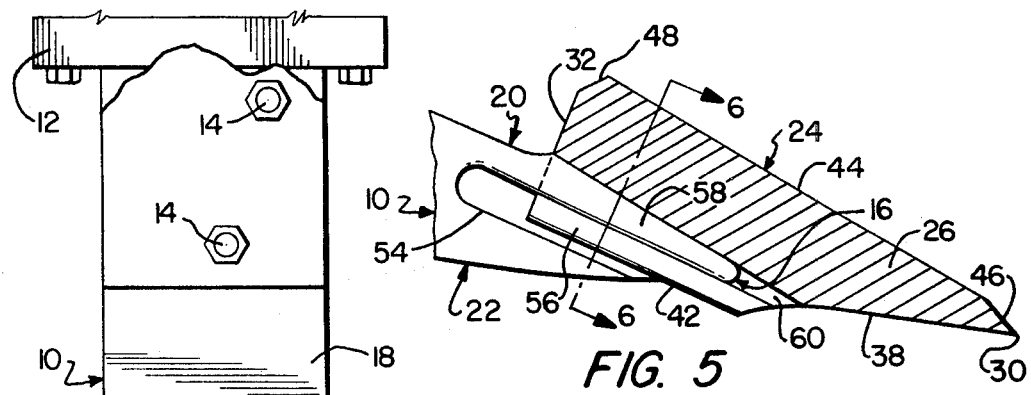
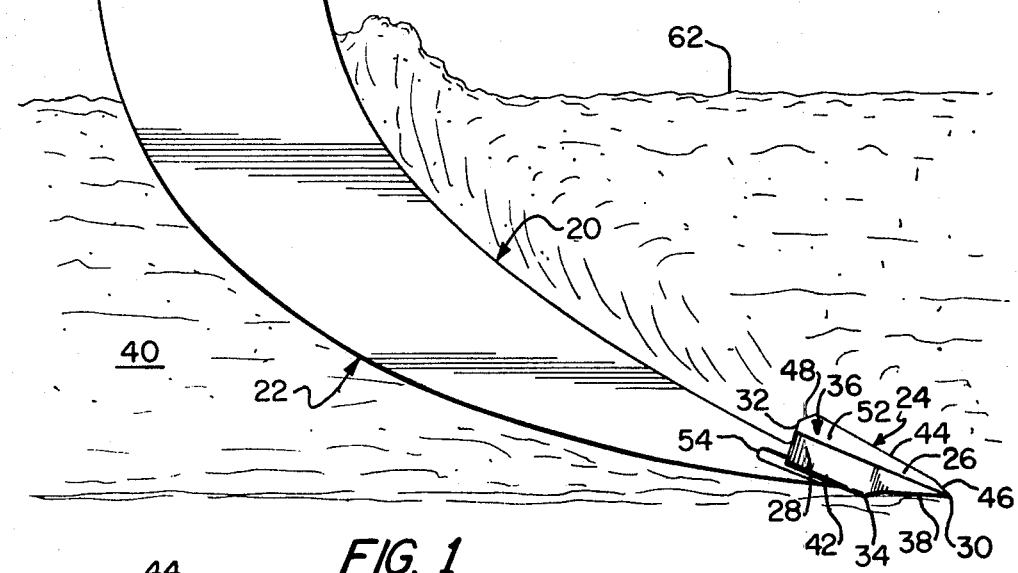
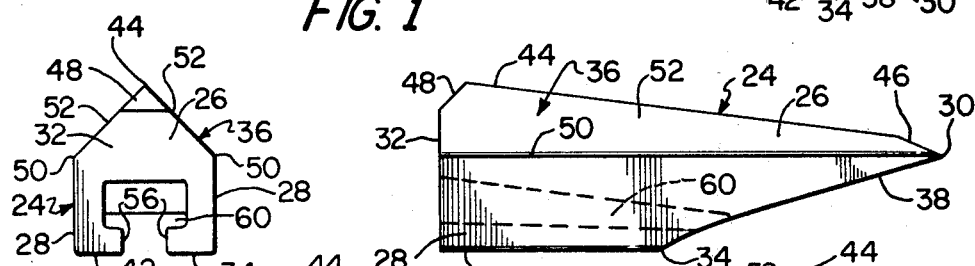
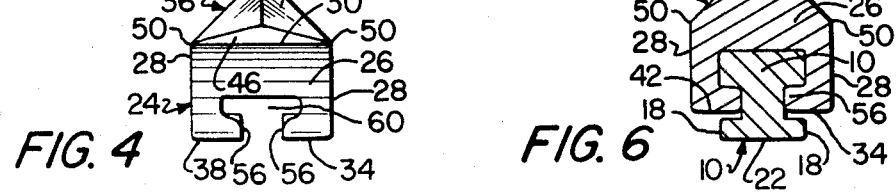
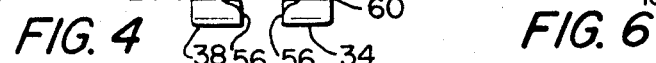

STREAMLINED WEAR-RESISTANT DEEP TILLAGE TOOL

Conventional shoes for deep or subsoil tillage shanks are not long-lasting because of rapid and extensive top surface wear immediately behind and for a considerable distance rearwardly of their leading cutter edges, as well as in other areas such as along their sides and leading, lowermost faces. Similar problems arise in undue wear of the shanks upon which the shoes are mounted, especially on their top-front faces immediately behind the shoes and along the sides of the shanks. These adverse effects result, to a large extent, from the curling of the soil ahead of the shanks.

In our invention, on the other hand, the shoe is sized in relation to the shank and shaped such as to split, and therefore, disrupt the curl-up of the soil sufficiently to appreciably alleviate the wearing problems.

We are familiar with the following prior art patents:
Great Britain Pat. No. 1,200,791, Aug. 5, 1970
Great Britain Pat. No. 1,022,844, Mar. 16, 1966
U.S. Pat. No. 2,904,119, Sept. 15, 1959
U.S. Pat. No. 3,517,752, June 30, 1970
U.S. Pat. No. 2,619,054, Nov. 25, 1952
Canada Pat. No. 496,012, Sept. 8, 1953

While the above patents disclose various types of replaceable shoes, for shanks or other supports, adapted to penetrate the soils except for British Pat. No. 1,022,844, the shoes are not designed for subsoil uses. In each of British Pat. No. 1,200,791; Canadian Pat. No. 496,012; U.S. Pat. Nos. 2,904,119 and 2,619,054 the tools are employed for the purpose of shallow application of liquid fertilzers, presenting no problems comparable to those solved by the present invention. See also our U.S. Pat. Nos. 3,919,951 and 4,033,271.

The same is true with respect to the furrow opener of U.S. Pat. No. 3,517,752. In British Pat. No. 1,022,844, designed to produce subsoil ducts for construction of holes, tillage, as such, not being the object, altogether different design characteristics are encountered.

In any event, despite the many suggestions presented by those patents relating to shoe size, shape and disposition, angle of attack, and other factors, none is directed to the problem of extreme wear or to the necessary solutions in connection with subsoilers using abnormally large, long shanks which must be forced through the dense subsoil to be loosened at relatively great depths without necessarily bringing the subsoil to the surface as in the case of typical plows, cultivators, seeders and the like.

In the drawings:

FIG. 1 is a side elevational view of a streamlined wear-resistant deep tillage tool made in accordance with our present invention showing the shank and the shoe in use within the soil;

FIG. 2 is a side elevational view of the shoe removed from the shank;

FIG. 3 is a rear-end view of the shoe;

FIG. 4 is a front-end view of the shoe;

FIG. 5 is an enlarged view showing the shank fragmentarily with the shoe vertically sectioned medially thereof; and FIG. 6 is a cross-sectional view taken on line 6—6 of FIG. 5.

By way of example, one of a plurality of side by side, laterally spaced (usually about 20") elongated, heavy, solid deep tillage shanks 10 is shown removably secured to a tool bar 12 therebeneath by a pair of releasable fasteners 14. The shank 10 has a leading edge 16 and a pair of opposed, flat, horizontally spaced, upright walls 18. The shank 10 is also provided with an upper, longitudinally concave, downwardly and forwardly sloping top 20 and a lower, longitudinally convex, downwardly and forwardly sloping bottom 22. The top 20 and the bottom 22 converge as the edge 16 is approached and span the distance between the walls 18.

A streamlined shoe 24 for receiving the edge 16 has an elongated body 26, adapted for attachment to the shank 10 at the edge 16; the body 26 has a pair of opposed, parallel, flat, horizontally spaced, upright sides 28, and a forwardmost, elongated, straight, sharpened terminus 30 spanning the distance between the sides 28. The body 26 is also provided with a flat, rearmost end 32 spanning the distance between the sides 28 and an elongated, lowermost, transversely flat face 34 as well as an elongated, uppermost surface 36 extending between the terminus 30 and the end 32. As best seen in FIG. 6, the distance between the sides 28 is greater than the distance between the walls 18.

The lower face 34 has two portions, including a first, elongated, portion 38 which merges with the terminus 30 and, as shown in FIGS. 1 and 5, is normally in an inclined position when the shoe 24 is in soil 40. A second elongated, longitudinally flat portion 42 normally slopes upwardly and rearwardly toward the end 32 when the shoe 24 is in the compacted soil 40 and spans the distance between the portion 38 and the end 32. The portion 38 is also essentially flat longitudinally thereof. As to be noted in FIGS. 5 and 6, the portion 38 extends forwardly beyond the edge 16 and at a lower elevation than that of the edge 16 when the shoe 24 is attached to the shank 10. FIGS. 1 and 6 also show the end 32 extending upwardly beyond the top 20 of the shank 10.

The surface 36 has a straight, longitudinally extending, medial ridge 44 together with a pair of bevels. A forwardmost, flat, triangular bevel 46 slopes downwardly and forwardly from the ridge 44 and merges with the terminus 30. A rearmost, flat, triangular bevel 48 slopes downwardly and rearwardly from the ridge 44 and merges with the end 32, such that the apexes of both the bevels 46 and 48 merge with the ridge 44. Accordingly, the terminus 30 becomes the base of the bevel 46 and the base of bevel 48 merges with the end 32. FIGS. 1 and 5 also show the end 32 sloping upwardly and forwardly from the portion 42 toward the bevel 48 when the shoe 24 is in the soil 40.

Each of the sides 28 has an upper, straight, longitudinal extremity 50 spaced below the base of the bevel 48. When the shoe 24 is in the soil 40, the extremities 50 slope downwardly and forwardly from the end 32 to the terminus 30. The surface 36 has a pair of elongated, flat, transversely inclined sections 52 that span the distance between the bevels 46 and 48. Each section 52 merges with the ridge 44, with the end 32, with the terminus 30 and with the extremity 50 of the corresponding side 28.

The manner of attaching the replaceable, slip-on wear shoe 24 on the shank 10 of the subsoil plow forms no part of our present invention. As shown, however, each wall 18 has a longitudinally extending slot 54 adapted to receive a corresponding flange 56 on the shoe 24. Tongue 58 on the shank 10 and recess 60 in the shoe 24 are tapered to provide a wedging effect and close fit when the shoe 24 is slipped into place over the shank 10 such as to hold the shoe 24 firmly in place and against lateral displacement. The shoe 24 is otherwise solid and heavy and may be provided with a hard outer, wear-resistant surface of carbide type material.

The downward-forward slope of the front portion 38 of the lower face 34 from the rear portion 38 to the transversely straight cutting edge 30 should be such as to provide the proper angle of attack, usually from about 3° to approximately 7°.

In use, the shoe 24 digs well below surface 62 of the soil 40 (oftentimes as deep as 18–22″) and the top-front 22 as well as walls 18 of the shank 10 are, therefore, subjected to considerable wear, the greatest of which wear is normally adjacent and immediately behind conventional shoes on shanks of this type. In our shoe 24, on the other hand, as depicted in FIG. 1, there is no curl up of the soil 40 immediately behind the end 32 either onto the top 20 or against the walls 18 of the shank 10, thereby protecting the shank 10 against undue wear in those areas. Moreover, because of the inclined sections 52 of the surface 36 and the ridge 44, the soil 40 is split ahead of the shank 10 protecting it still further. Contributing to these good end results is the increased width of the shoe 24 between its sides 28 in relation to the width of the shank 10 between the walls 18, and the rise of the end 32 well above the top 20.

It should be observed that the weakest portion of the shank 10 is at its leading edge 16 and rearwardly therefrom beneath the shoe 24 as well as rearwardly of the slots 54 where the shank 10 is relatively narrow and thin. Yet, when used with conventional shoes it is that weakest portion which is subjected to the greatest wear. The top 20 and the walls 18 of the shank 10 rearwardly of such weak portion are normally able, over long periods of use, to withstand the substantial wear to which they are subjected by the abrasive action of the soil, rocks and other materials. Also, in conventional subsoiler shoes the wear away of the cutting edge and rearwardly therefrom along the sides, top and bottom is so extensive and occurs so quickly that their useful life is quite short.

However, observations after actual use of the shoes 24 has demonstrated that, after long periods of time, there is little, if any, wear along the top, sides and bottom of the shank 10 either adjacent or near the shoe 24. Moreover, the only appreciable wear on the shoe 24 is that which slightly reduces its overall length from edge 30 to end 32. That is, the edge 30 is self-sharpening and the abrasive action is limited essentially to wear away from edge 30 rearwardly of the entire body 26 between sides 28 and between surfaces 36 and 38, while edge 30 remains in its sharpened condition and bottom portion 38 shows no sign of wear whatever. Splitting of the soil along the ridge 44 and causing soil curl-up to strike the shank 10 well behind and upwardly of the shoe 24 contributes to the excellent wearability of both the shank 10 and the shoe 24.

While shoes made according to our instant invention may vary in width and in length, depending in part upon the nature of the shanks with which they are to be used, the above described configuration, disposition and angles of the chisel-shaped shoe 24 should be maintained to properly protect both the shank and the shoe 24.

We claim:

1. In a farm implement:

a normally horizontal tool bar;

an elongated, solid, deep tillage shank attached to the bar and depending therefrom, said shank having a pair of opposed, flat, horizontally spaced, upright walls, an upper, longitudinally concave, downwardly and forwardly sloping top, a lower, longitudinally convex, downwardly and forwardly sloping bottom, and a leading edge, said top and bottom spanning the distance between said walls and converging as said edge is approached; and a shoe releasably attached to said shank, said shoe being provided with an elongated body having a pair of opposed, parallel, flat, horizontally spaced, upright sides provided with upper, straight, downwardly and forwardly sloping, longitudinal extremities, a forwardmost, elongated, straight, sharpened terminus, a flat rearmost end extending upwardly beyond said top, an elongated, downwardly and forwardly inclined, uppermost surface, and an elongated, lowermost, transversely flat face, the distance between said sides being greater than the distance between said walls, said terminus and said end spanning the distance between said sides, said surface extending between said terminus and said end, said face having a first, elongated portion extending forwardly beyond said edge at an elevation lower than the latter and merging with said terminus and a second elongated, longitudinally flat portion between the first portion and said end, the first portion being normally inclined downwardly and forwardly toward said terminus, the second portion being normally inclined upwardly and rearwardly toward said end, said shoe having a flat, rear, triangular bevel merging with said end thereabove and a flat, front, triangular bevel merging with said terminus thereabove, said surface having a pair of opposed, transversely inclined, essentially triangular sections merging into an uppermost ridge spanning the distance between said bevels.

* * * * *